(12) United States Patent
Botchek (10) Patent No.: US 6,892,267 B2
(45) Date of Patent: May 10, 2005

(54) METHOD FOR MESSAGE TRANSMISSION EXPLOITING UNUSED DEVICE ADDRESSES

(75) Inventor: Robert Botchek, Saratoga, CA (US)

(73) Assignee: Relax Technology, Inc., Union City, CA (US)

( * ) Notice: Subject to any disclaimer, the term of this patent is extended or adjusted under 35 U.S.C. 154(b) by 469 days.

(21) Appl. No.: 10/123,571

(22) Filed: Apr. 15, 2002

(65) Prior Publication Data

US 2003/0196021 A1 Oct. 16, 2003

(51) Int. Cl.[7] .................. G06F 13/36; G06F 13/42; H04L 12/00
(52) U.S. Cl. .................. 710/315; 710/104
(58) Field of Search .................. 710/3, 315, 4, 710/9, 104, 72, 105; 370/451, 475; 340/825.52; 713/1

(56) References Cited

U.S. PATENT DOCUMENTS

| | | | |
|---|---|---|---|
| 3,787,627 A | 1/1974 | Abramson et al. | 179/15 BA |
| 4,249,240 A | 2/1981 | Barnich | 364/200 |
| 4,796,025 A | 1/1989 | Farley et al. | 340/825.08 |
| 4,807,224 A | 2/1989 | Naron et al. | 370/94 |
| 4,910,655 A | 3/1990 | Ashkin et al. | 364/200 |
| 4,918,598 A | 4/1990 | Ashkin et al. | 364/200 |
| 5,107,256 A | 4/1992 | Ueno et al. | 340/825.52 |
| 5,191,655 A | 3/1993 | Sarkissian | 395/275 |
| 5,734,900 A * | 3/1998 | Kaiser et al. | 713/2 |
| 5,809,531 A * | 9/1998 | Brabandt | 711/141 |
| 6,526,459 B1 * | 2/2003 | Campbell et al. | 710/51 |

OTHER PUBLICATIONS

"An integrated high performance FASTBUS slave interface" by Christiansen, J.; Ljuslin, C. (abstract only) Publication Date: Aug. 1993.*

"Intelligent peripheral modules and applications performed by modular microcontrollers" by Melear, C. (abstract only) Publication Date: Jun. 27, 1996.*

* cited by examiner

Primary Examiner—Gopal C. Ray
(74) Attorney, Agent, or Firm—Beyer Weaver & Thomas LLP (57) ABSTRACT

A computer-readable media for transmitting data from a computer system comprising a processor, a bus with at least a first address for which no device is available and an element connected between the processor and the bus is provided. Computer-readable code for sending a message from the controller to the first address where no device is available, wherein the sending of the message prepares the element connected between the processor and the bus is provided.

17 Claims, 3 Drawing Sheets

METHOD FOR MESSAGE TRANSMISSION EXPLOITING UNUSED DEVICE ADDRESSES

FIELD OF THE INVENTION

This invention relates generally to a method for exploiting unused computer device addresses in the control of computer peripherals and more specifically to the transfer of data between computer systems and storage devices such as hard disks.

BACKGROUND OF THE INVENTION

Computer peripherals are typically connected to a computer system through one or more buses. Each bus typically supports a plurality of unique addresses, and each peripheral typically responds to one or more addresses or ranges of addresses within the plurality of addresses supported by each bus. Within the computer system, one or more CPUs are typically responsible for constructing and sending commands to each peripheral through these buses, though it will be readily apparent to one skilled in the art that such commands may also be generated by state logic implemented without the need of a CPU.

ATA hard disk devices are typical of the computer peripherals, which follow this model. Each device is connected to the computer through an ATA bus, sometimes also referred to as the IDE or EIDE bus, and each device responds to a unique address on the ATA bus. An ATA bus provides for two unique device addresses on each physical bus. The device responding to the first device address is referred to as the master and the device responding to the second device address is referred to as the slave. When only one device is connected to the ATA bus it is commonly, though not always, assigned the address corresponding to the master.

Computer systems incorporating ATA devices also generally incorporate an ATA controller. The ATA controller acts as an intermediary between the CPU or state logic responsible for generating each ATA command and the ATA devices. The ATA controller is typically connected directly to the ATA bus and also typically has a connection to a buffer management unit. The buffer management unit is typically responsible for directing data between the ATA controller and buffer memory. Buffer memory provides temporary storage for data exchanged with the ATA devices. Data in the buffer memory may be operated upon by a CPU or may be transferred elsewhere by way of one or more data interfaces also connected to the buffer memory controller. One skilled in the art will recognize that the buffer management unit described herein is a form of a DMA (Direct Memory Access) controller. DMA controllers are implemented in many forms, though all exhibit the property of being able to transfer data between memory and other devices or circuitry within a system and to do so independently of the CPU. To avoid confusion with other uses of the term DMA later in this specification, the DMA controller will be referred to as the buffer management unit.

The commands generated by the CPU or state logic for execution by the ATA devices are specified according to industry standards such as ATA-5 and ATA-6, which are examples of protocol specifications. As the needs for capacity, capability, and speed increase, new revisions of such industry standards are drafted and eventually adopted. New features added in such revisions are generally not supported by earlier implementations. In some cases, new features may be supported by modifying the CPU program code responsible for generating commands for the ATA devices. In other cases, the implementation of new features may require modifications to the hardware of state logic, of the ATA controller, or of the ATA devices. It is most common for this hardware to be implemented in custom ICs. Therefore, modifications to this hardware require redesigns to ICs, an expensive process which generally takes a minimum of three months and more commonly takes six to twelve months. The modification to ICs often further necessitates changes to the board designs incorporating these ICs and to the programs executed by the CPU responsible for generating commands. Lastly, there is often a reduction in shipments and a loss of revenue associated with the time spent modifying products to support new industry standards.

A specific example illustrates these effects. The ATA-6 specification adds new commands to allow the computer system to access the full capacity of ATA hard disk devices up to a capacity limit corresponding to 48-bit sector addresses wherein each sector is typically 512 bytes. This provides an effective addressable capacity of 281, 474, 976, 710, 655 sectors or approximately 144 petabytes. The earlier standards, up to and including the ATA-5 specification, provided commands capable of supporting a capacity limit corresponding to 28-bit sector addresses. The earlier standards therefore supported an effective addressable capacity of 268, 435, 455 sectors or approximately 137 gigabytes. When hard disks with capacities larger than 137 gigabytes started shipping, computer systems supporting the earlier standards up to and including the ATA-5 specification were unable to address the full capacity of the devices. For vendors of such high-capacity hard disks, this limited the effective market for the new hard disks. For computer system vendors, this created a support problem and a potential loss of business to competitors who could support the new ATA-6 standard.

One class of products for which the new ATA-6 standard presented such a problem is 1394-to-ATA device bridges. Such bridges permit standard ATA hard disks to be used as 1394 hard disks. 1394 is an IEEE standard describing a high-speed serial bus interface. IEEE-1394 is commonly referred to by the name given to it by Apple Computer known as FireWire. IEEE-1394 is also referred to by the name given to it by Sony known as i-Link.

Most 1394-to-ATA bridges are implemented using custom ICs, and at least one such widely used custom IC provides no built-in support for the new ATA-6 standard. This IC, the OXFW911 from Oxford Semiconductor, has hard-wired knowledge of all known ATA commands (op codes) up to and including those found in the ATA-5 specification. The OXFW911 therefore does not recognize the new ATA-6 commands. As such, the OXFW911 is unable to process ATA-6 commands correctly and fails to support the new ATA-6 standard. This means that 1394-to-ATA bridges using the OXFW911 are unable to work with drives supporting the ATA-6 standard. Although the OXFW911 may be used in a manual mode to send commands conforming to the ATA-6 standard, the OXFW911 will not recognize or interpret such manually sent commands. Consequently, the OXFW911 will not enable the automatic transfer of data between the ATA bus and the buffer management control unit for such manually sent commands. For example, the controller may not realize that data is to be received and may not turn on the OXFW911 buffer management control unit, thus preventing a high speed transfer of such data.

The OXFW911 is designed to recognize and interpret ATA commands, in part, so that it can determine the correct ATA transfer mode to use for each command. ATA transfer modes define the relationship and timing of specific ATA bus electrical signals used to exchange data across the ATA bus. Examples of ATA transfer modes are PIO (Programmed Input/Output) modes 0–4, DMA (Direct Memory Access) modes 0–2, and Ultra DMA modes 0–5. Note that the term DMA in the context of ATA transfer mode naming has no relationship to circuitry often associated with the buffer memory controller, which is also referred to as DMA.

As introduced in the preceding section, the most prevalent approach by which a computer system addresses peripheral devices is to assign unique addresses to each device. In such approaches, each device is connected to the computer system through one or more buses, each bus generally having a plurality of device addresses. Each device acts on or responds to messages sent to one or more addresses or ranges of addresses within this plurality of addresses available on each bus. The assignment of addresses to devices on each bus may be fixed at the time of design, fixed at the time of configuration, or may be dynamic, that is, assigned when the system runs. U.S. Pat. No. 4,249,240 to Barnich (1981), U.S. Pat. No. 4,796,025 to Farley et al. (1989), U.S. Pat. Nos. 4,910,655 (1990) and U.S. Pat. No. 4,918,598 (1990) to Ashkin et al., U.S. Pat. No. 5,107,256 to Ueno et al. (1992), and U.S. Pat. No. 5,191,655 to Sarkissian (1993) all refer to the use of unique device addresses for each device. U.S. Pat. No. 3,787,627 to Abramson et al. (1974) discusses the use of unique addresses for each device wherein said addresses are assigned dynamically.

A prevalent variation on the preceding approach is for a computer system to broadcast a message to other devices, including other computer systems or peripherals. In such approaches, one or more unique addresses on a bus are reserved as broadcast addresses. It is understood in such approaches that messages sent to such broadcast addresses are not necessarily intended for a specific recipient. Rather, the broadcast message will be interpreted by some or all devices on the bus and only those devices for which the broadcast message carries relevant information will act on or respond to the broadcast. U.S. Pat. No. 4,807,224 to Naron et al. (1989) refers to the use of such broadcasts.

The underlying assumption in the above-cited patents is that one or more devices will act on messages sent to one or more device addresses and that there will be a useful result as the byproduct of said action.

SUMMARY OF THE INVENTION

To achieve the foregoing and in accordance with the purpose of the present invention, a method of exchanging data between a device and a bridge comprising a processor, a controller controllably connected to the processor, a buffer memory controller connected to the processor and the controller, and a bus connected between the controller and the device, wherein the bus has a first address which is the address of the device and a second address where no device is available and wherein the controller is able to automatically process commands in a first format and the device is able to process commands in a second format different than the first format is provided. A manual command is sent in the second format from the controller over the bus to the first address wherein the controller ignores the manual command and the device receives the command. The command is converted into a converted command in the first format. The converted command is automatically sent from the controller over the bus to the second address wherein the controller uses the automatically sent converted command to prepare for an automatic data transfer and wherein the device ignores the converted command sent to the second address. Data is automatically transferred through the controller between the buffer memory controller and the device, wherein the controller automatically transfers data as a result of the automatically sent converted command to the second address and the device transfers data as a result of the manual command.

In another embodiment, a computer-readable media for exchanging data between a device and a bridge comprising a processor, a controller controllably connected to the processor, a buffer memory controller connected to the processor and the controller, and a bus connected between the controller and the device, wherein the bus has a first address which is the address of the device and a second address where no device is available and wherein the controller is able to automatically process commands in a first format and the device is able to process commands in a second format different than the first format is provided. Computer-readable code for sending a manual command in the second format from the controller over the bus to the first address wherein the controller ignores the manual command and the device receives the command is provided. Computer-readable code for converting the command into a converted command in the first format is provided. Computer-readable code for automatically sending the converted command from the controller over the bus to the second address wherein the controller uses the automatically sent converted command to prepare for an automatic data transfer and wherein the device ignores the converted command sent to the second address is provided. Computer-readable code for automatically transferring data through the controller between the buffer memory controller and the device, wherein the controller automatically transfers data as a result of the automatically sent converted command to the second address and the device transfers data as a result of the manual command is provided.

In another embodiment of the invention, a computer-readable media for transmitting data from a computer system comprising a processor, a bus with at least a first address for which no device is available and an element connected between the processor and the bus is provided. Computer-readable code for sending a message from the controller to the first address where no device is available, wherein the sending of the message prepares the element connected between the processor and the bus is provided.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The central technique at the foundation of the present invention is the transmission of a command to a device address at which no device is present. Even though no device is present at said device address and no device will act on said command as if it were a broadcast message, a beneficial result will be recognized elsewhere in the computer system. In particular, a beneficial result will be observed in the device controller itself in the circumstances as described herein.

The result is that a device controller operates as if it is processing a legitimate command for which it was originally designed, even though the actual command being processed is beyond the scope of the device controller's original design.

A possible advantage of this technique is that it permits an existing device controller to support commands described by specifications for which it was not originally designed. This may provide considerable market advantages by eliminating the significant costs of hardware and custom IC redesign, extending the life of existing products and tooling, and permitting the rapid introduction of products supporting new specifications and the resulting increase in revenue.

The present invention exploits a novel use of the device addressing scheme employed by ATA controllers and ATA devices. In this manner, the present invention overcomes the limitations of hardware, and more specifically of custom ICs, that render such hardware incapable of supporting new commands added in the ATA-6 specification. As a central element of the present invention relates to a novel use of device addressing, the following discussion focuses on prevalent addressing schemes. The above-cited patents fail to anticipate that a useful result may follow from the transmission of messages to device addresses at which no device is present and at which no device will take action for said messages.

Figure 1:
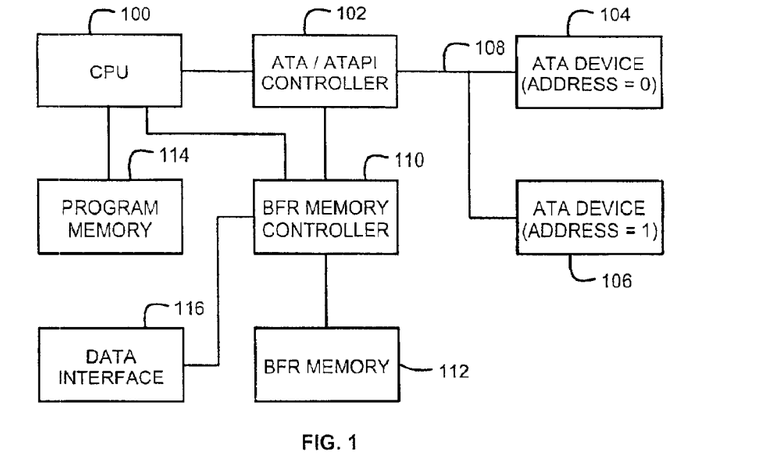
FIG. 1 is a block diagram illustrating functional blocks common to systems supporting ATA devices.
Figure 2:
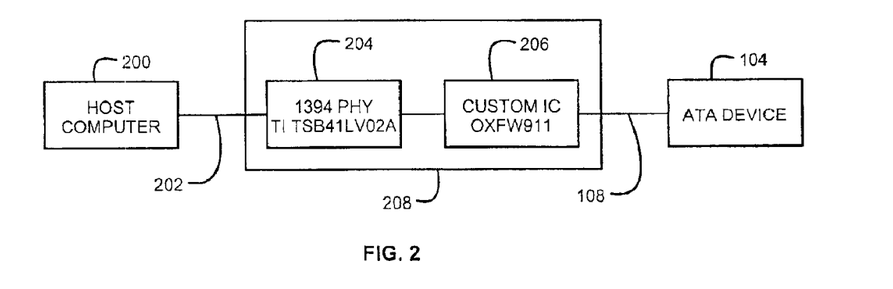
FIG. 2 is a block diagram illustrating the preferred embodiment of the present invention.

FIG. 1 illustrates the major functional blocks that will commonly be found in a system implementing support for ATA devices. FIG. 2 illustrates the preferred embodiment of the present invention. The preferred embodiment in FIG. 2 incorporates the functional blocks illustrated in FIG. 1.

In FIG. 1, a CPU 100 is responsible for the generation of commands to be sent to an ATA device 104 connected to an ATA bus 108. ATA commands and data flow are directed by an ATA controller 102. One skilled in the art will recognize that the ATA bus 108 is but one kind of bus, that the ATA controller 102 is but one kind of bus interface, and that the ATA device (104, 106) is but one kind of bus device. One skilled in the art will recognize that other buses, bus interfaces, and bus devices may be substituted in their respective positions without departing from the scope of the present invention.

The ATA controller 102 is capable of operating in two modes, an automatic mode and a manual mode. In the automatic mode, the ATA controller 102 receives commands from the CPU 100 and handles the transmission of said commands to the ATA device 104 autonomously. In the automatic mode, the ATA controller 102 also directs data between the ATA device 104 and a buffer memory 112 by way of a buffer memory controller 110. In the manual mode, the ATA controller 102 gives the CPU 100 the ability to transmit commands directly to the ATA device 104. In this embodiment, in the automatic mode, the ATA controller 102 uses the command that is sent in the automatic mode to prepare the ATA controller 102 for a faster automated data transfer.

The ATA device 104 responds at ATA address 0, generally referred to in the ATA specifications as the master. A second ATA device 106 is permitted according to the ATA specifications and responds at ATA address 1, generally referred to in the ATA specifications as the slave. However, in the preferred embodiment, the second ATA device 106 is not present, and therefore, no device will respond at ATA address So that useful work may be performed on data transferred between the ATA device 104 and the buffer memory 112, the buffer memory controller also has connections to the CPU 100. This allows the CPU 100 to examine or modify data in the buffer memory 112. An additional connection from the buffer memory controller 110 to one or more data interfaces 116 allows data to be transferred elsewhere for processing.

The CPU 100 executes stored programs from a program memory 114. The program memory 114 is a form of computer readable media that contains computer readable code that may be read and executed by the CPU 100.

FIG. 2 illustrates the preferred embodiment in which the CPU 100, ATA controller 102, buffer memory controller 110, buffer memory 112, program memory 114, and data interface 116 are implemented in a single custom IC 206. In the preferred embodiment, the custom IC 206 is an OXFW911 from Oxford Semiconductor of Oxford, England. The data interface 116 implemented in the custom IC 206 connects to a 1394 bus 202 through a 1394 PHY 204. In the preferred embodiment, the 1394 PHY 204 is a TSB41 LV02A from Texas Instruments, Dallas, Tex. The 1394 PHY 204 translates between the digital domain of the custom IC 206 and the analog domain of the 1394 bus 202. In the preferred embodiment, the custom IC 206 and the 1394 PHY 204 are integrated on a single printed circuit board called the bridge 208. The bridge 208 connects to a host computer 200 through the 1394 bus 202 and to the ATA device 104 through the ATA bus 108.

Operation

Figure 5:
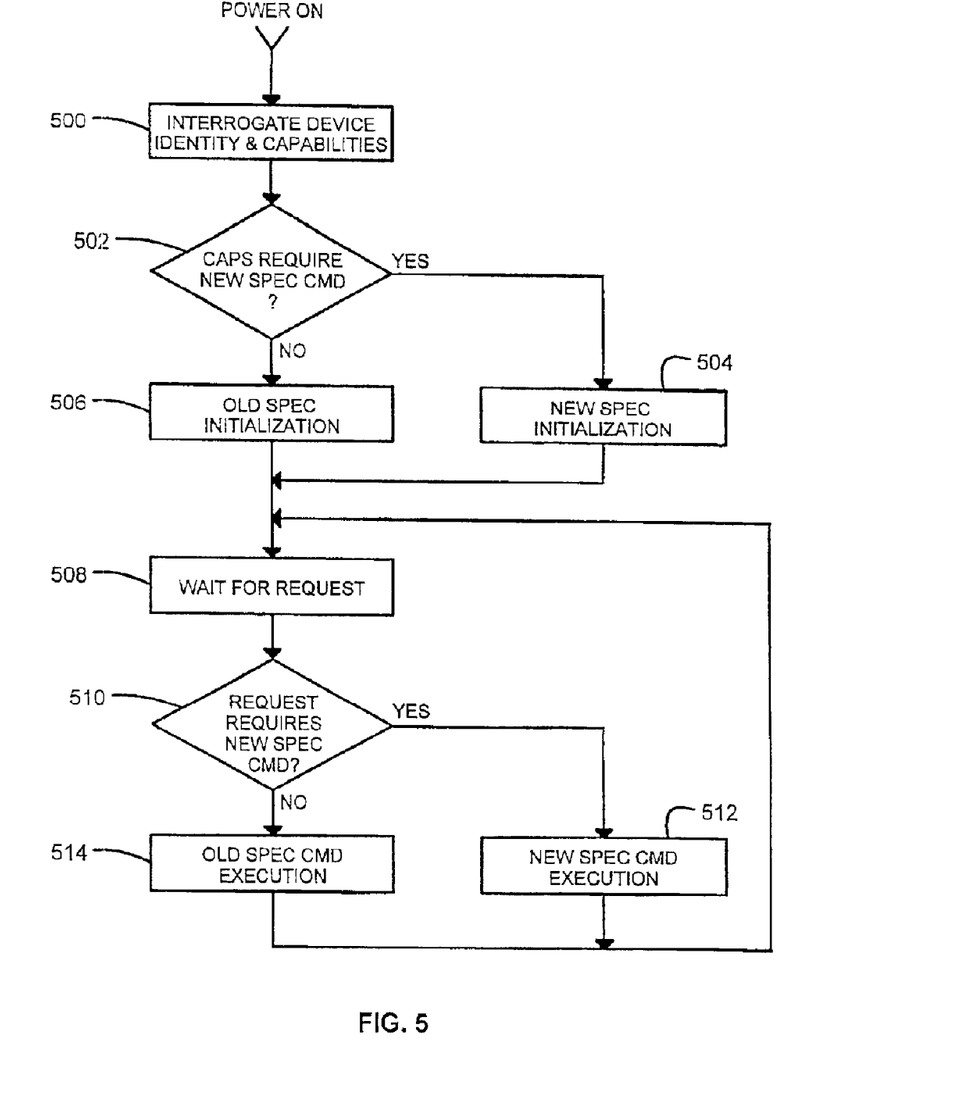
FIG. 5 is a flowchart of the operation of an embodiment of the invention.

To facilitate understanding of the invention, FIG. 5 is a flow chart of the operation of an embodiment of the invention. After the system is powered on, the operation of the bridge 208 may generally be divided into two phases, the initialization phase and the active phase. During the initialization phase, the CPU 100 uses the ATA controller 102 to interrogate the ATA bus 108 and learn the identity and capabilities of the connected ATA device or devices (104, 106) (step 500). This initialization step required to interrogate the ATA bus 108 will be readily apparent to one skilled in the art. Therefore, these will not be described in further detail.

In the remainder of this discussion, we will assume that only a single ATA device 104 is present and that ATA device 106 is not present.

From the capabilities of the device, the CPU 100 can infer the level of the ATA specification supported by the device.

From this information, the CPU 100 can determine whether the ATA controller 102 natively provides support for the level of the ATA specification required by the ATA device 104 (step 502). In order to demonstrate the operation and advantages of the present invention, it is assumed for the remainder of this discussion that the ATA device 104 supports a level of the ATA specification higher than that supported by the ATA controller 102. More particularly, it is assumed that the ATA device 104 supports the ATA-6 specification for 48-bit sector addressing, so that the corresponding commands will be referred to as new specification commands or commands in a second format. Commands from the ATA-5 and earlier specifications will be referred to as old specification commands or commands in a first format.

A suitable ATA device 104 for demonstrating operation of the preferred embodiment is the ATA hard disk model 4G160J8 from Maxtor Corp. of Milpitas, Calif.

The custom IC 206 used in the preferred embodiment has hard-wired knowledge of all ATA commands up to and including those found in the ATA-5 specification. The hard-wired custom IC 206 does not have knowledge of the new specification commands required to implement 48-bit sector addressing. The custom IC 206 uses its hard-wired knowledge of commands to determine, among other things, when to enable the automatic transfer of data between the ATA bus 108 and the buffer memory controller 110. Therefore, since the custom IC 206 has no knowledge of the new specification commands required to implement 48-bit sector addressing, it will fail to enable the automatic transfer of data between the ATA device 104 and the buffer memory controller 110.

If the CPU 100 determines that the ATA device 104 requires support for new specification commands and determines that the ATA controller 102 supports only old specification commands and determines that there is not a device available at one of the addresses, a new specification command initialization is performed (step 504). This new specification command initialization initializes both the controller 102 and the ATA device 104 to the same transfer mode. This step is shown in more detail in the flow chart illustrated in FIG. 3.

Selection of Transfer Mode

Figure 3:
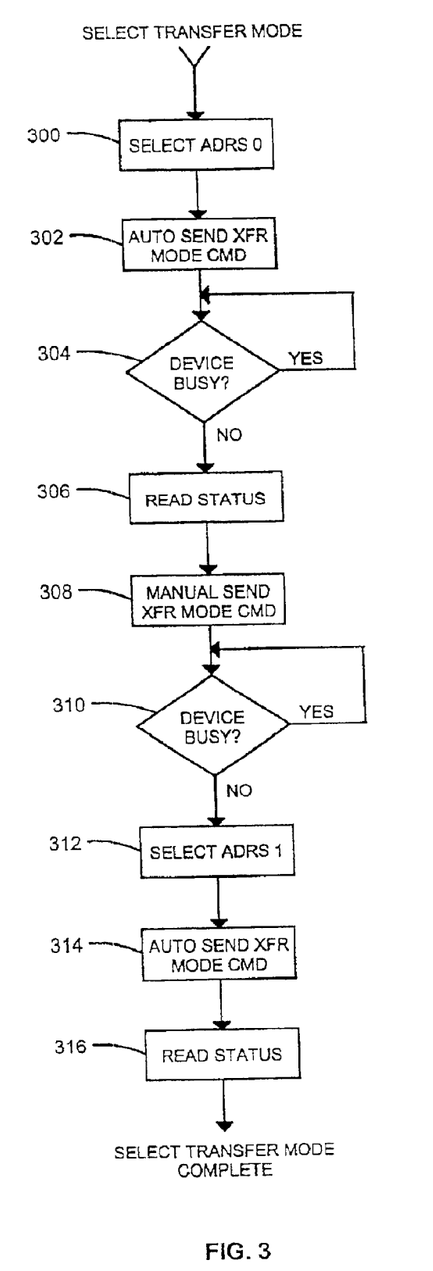
FIG. 3 is a flowchart showing the sequence of steps employed when sending a command to a device.

The ATA device 104 and the custom IC 206 must be set for the ATA transfer mode that will be used for communication between the ATA device 104 and the ATA controller 102. The CPU 100 determines the transfer mode based on the capabilities returned by the ATA device 104 during the device interrogation discussed earlier. From this determination, the CPU 100 builds an ATA command to select the ATA transfer mode. From this point, the procedure continues as shown in FIG. 3.

In step 300, the CPU 100 directs the ATA controller 102 to select ATA address 0. ATA address 0 corresponds to ATA device 104.

In step 302, the CPU 100 directs the ATA controller 102 to send the ATA transfer mode command automatically. As it sends the command automatically, the ATA controller 102 in custom IC 206 also interprets the command and records the correct transfer mode to use for subsequent data transfer commands with the ATA device 104 at ATA address 0.

In steps 304 and 306, the ATA controller automatically waits for the ATA device 104 to process the transfer mode command and then reads the status generated by the ATA device 104 in response to the command.

In step 308, the CPU 100 uses the ATA controller 102 to send the same transfer mode command manually to ATA device 104. When sending the commands manually, the ATA controller 102 in custom IC 206 does not attempt to interpret the command nor does it record any information in relation to the command.

In step 310, the CPU 100 uses the ATA controller 102 to wait manually for the ATA device 104 to process the command. Upon completing the command, the ATA device 104 will be ready to return status. However, we do not choose to read the status at this time.

In step 312, the CPU 100 directs the ATA controller 102 to select ATA address 1. ATA address 1 corresponds to ATA device 106, which, as noted earlier, is not physically present. However, the ATA controller 102 is not aware that ATA device 106 is not present.

In step 314, the CPU 100 directs the ATA controller 102 to send the ATA transfer mode command automatically. As it sends the command automatically, the ATA controller 102 in custom IC 206 also interprets the command and records the correct transfer mode to use for subsequent data transfer commands with the ATA device 106 at ATA address 1.

In step 316, the ATA controller 102 automatically reads the status. The status read in step 316 is actually the status generated by ATA device 104 in response to the ATA transfer mode command that is sent manually in step 308. However, the ATA controller 102 cannot determine the source of the status and therefore assumes that the status is a response to the command sent in step 314 to ATA device 106 at ATA address 1. Since the auto send command of step 314 was sent to address 1, ATA device 104, which is at address 0, ignores the command sent to address 0, since ATA device 104 is not at address 1.

To summarize the steps in FIG. 3, the CPU 100 causes the desired ATA transfer mode command to be sent three times, though the ATA controller 102 interprets and records data for only the first and third transmissions of the command, interpreting them as intended for ATA devices 104 and 106 at ATA address 0 and 1, respectively. The second transmission of the command in step 308 is required so that suitable status will be available for the ATA controller to read in step 316. This suitable status response generated by the device 104 at address 0 but interpreted by the controller 102 as coming from address 1 is required so that the controller 102 will record the transfer mode for address 1 designated by the automatic message sent to address 1. This is because the controller 102 requires a confirmation response from a device to confirm that the transfer mode has been sent correctly. Though ATA device 104 at ATA address 0 is the only device physically present, the ATA controller 102 must be initialized for both ATA address 0 and ATA address 1 in order to support the same data transfer technique for new specification commands.

If the CPU 100 determines that the ATA device 104 and the ATA controller 102 support the same specification commands, then a conventional specification for initializing data transfer modes may be used (step 506).

After initialization is complete, the bridge 208 is ready to process requests for data transfers from the host computer 200. The system then waits for a request (step 508). When a request is received, a determination is made of whether the request requires a new specification command (step 510). For purposes of illustrating the present invention, it is assumed, as noted earlier, that the ATA device 104 supports new specification commands for 48-bit sector addressing and that the ATA controller 102 supports only old specification commands lacking this capability. A request that requires data at an address outside of the limits for the ATA-5 specification (beyond the 48-bit sector addressing) would require a new specification command, whereas a command for data within the limits of the ATA-5 specification (within the 48-bit sector addressing) would be able to be implemented with an ATA-5 specification command.

Execution of Data Transfer Commands

Figure 4:
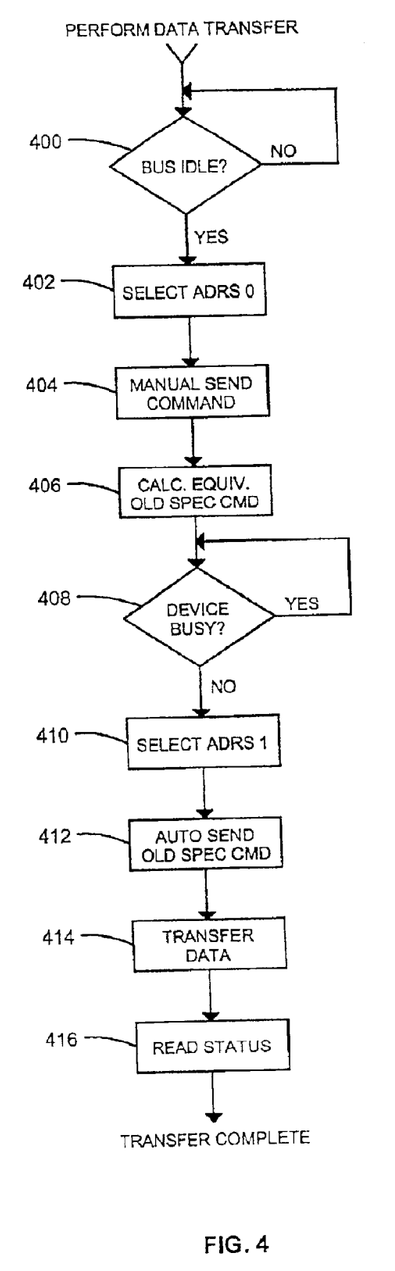
FIG. 4 is a flowchart showing the sequence of steps employed when setting transfer modes during system initialization.

FIG. 4 illustrates the steps required to execute new specification commands, in this case, data transfer commands supporting 48-bit sector addressing (step 512), when the request requires new specification commands.

In step 400, the CPU 100 uses the ATA controller 102 to wait for the ATA bus 108 to become idle. In step 402, the CPU 100 directs the ATA controller 102 to select ATA address 0. In step 404, the CPU 100 uses the ATA controller 102 to send the new specification command manually to ATA device 104. ATA device 104 begins processing the command.

In step 406, the CPU 100 translates the new specification command into an old specification command that will be recognizable to ATA controller 102. The translated old specification command specifies a function equivalent to the original new specification command, such as read, write, or verify. However, the old specification command may lack certain details, such as a complete sector address, as the new specification command may contain more data, for example, 48-bits of address data, than can be accommodated by the old specification command. Only such data as is necessary to elicit the correct behavior from the ATA controller 102 need be present in the translated old specification command.

In step 408, the CPU 100 directs the ATA controller 102 to wait for the ATA device 104 to signal that it has completed processing the command delivered in step 404 and that it is ready to begin transferring data for that command.

In step 410, the CPU 100 directs the ATA controller 102 to select ATA address 1.

In step 412, the CPU 100 directs the ATA controller 102 to send the translated old specification command automatically. This is the command generated in step 406. As it sends the command, the ATA controller 102 in custom IC 206 also interprets the command and enables the automatic transfer of data between the ATA bus 108 and the buffer memory controller 110. The ATA controller 102 cannot tell that a physical device is not present at ATA address 1, and assumes therefore that it will be transferring data with the device at ATA address 1.

In step 414, the ATA controller performs the automatic transfer of data between the ATA bus 108 and the buffer memory controller 110. Data is exchanged with ATA device 104, though, as noted above, the ATA controller 102 assumes that the data exchange is with ATA device 106, which, in fact, does not exist. As the ATA controller 102 assumes the data transfer is with the ATA device at ATA address 1, the ATA controller 102 uses the ATA transfer mode established for ATA address 1. This is why it was necessary to establish the same ATA transfer mode for both ATA addresses 0 and 1 in steps 300–316.

In step 416, the ATA controller 102 automatically reads the status generated by the ATA device 104. Once again, the ATA controller 102 believes it is reading the status from ATA device 106 at ATA address 1. Upon reading the status, the ATA controller terminates the command.

To summarize the steps in FIG. 4, a new specification command is sent manually to the ATA device 104 and a translated old specification command is sent automatically to the non-existent ATA device 106 at ATA address 1. The new specification command delivers the correct command and command parameters to the ATA device 104. The translated old specification command delivers information needed to coax the ATA controller 102 in custom IC 206 into transferring the data automatically between ATA device 104 and the buffer memory controller 110.

The state is then returned to step 508 to wait for the next request. If the request does not require a new specification command, a conventional old command specification execution process may be used (step 514), where an old specification command is automatically sent from the controller 102 to the ATA device 104. Then the state is returned to step 508 to wait for the next request.

When the new specification commands are sent, the controller 102 interpretsthe automatic data transferring as being performed with a device at address 1. This is why the data transfer mode for the new specification commands for address 1 needs to be recorded by the controller. For old command specifications, the controller 102 interprets the automatic data transferring as being performed with the device 104 at address 0. This is why the data transfer mode also needs to be set for address 0. The present invention describes a set of techniques, each derived from an innovative use of device addressing, to permit existing device controller hardware to support new specification for which it was not originally designed.

The key element of the invention is the exploitation of unused device addresses. Unused device addresses provide benign destinations for commands, which must appear to be executed to other elements of the system. The apparent execution of these commands triggers beneficial actions in other elements of the system, yielding tangible benefits in the support of new device specifications.

Though the preferred embodiment of the present invention relates to the use of unused device addresses for the transmission of ATA-6 commands for the support of 48-bit sector addressing from an ATA controller to an ATA device, the reader will appreciate that the underlying invention is not limited to this field.

One skilled in the art will recognize that the present invention may be applied to send to an ATA device any command not presently supported by the ATA controller.

One skilled in the art will also recognize that the present invention may be applied to the transmission of ATAPI commands not presently supported by an ATAPI controller. ATAPI is a specification that shares the electrical interface of the ATA specification but defines a different structure for the commands delivered to the device, referred to as an ATAPI device. Therefore, an ATAPI bus will be also designated as an ATA bus.

One skilled in the art will recognize that the present invention may be applied to the transmission of commands or messages on buses other than those conforming to the ATA and ATAPI specifications. Any bus that has unused device addresses and which permits the transmission of data to a device address without the requirement for an explicit acknowledgement from that same device address can implement the present invention. A bus that allows for N addresses may support N−1 devices using the invention. If all N−1 devices have the same data transfer mode, then the data transfer mode routine would only need to be performed at initialization.

In other embodiments of the invention, the computer system for implementing the invention, as shown in FIG. 1 and FIG. 2, may be replaced by other computer systems. Such computer systems may have many physical forms ranging from an integrated circuit, a printed circuit board, and a small handheld device, up to a super computer. As stated above, the CPU 100 may be replaced by state logic or other processing devices or by a plurality of CPUs. The CPU 100, state logic, and plurality of CPUs will be generally designated as a processor. The ATA/ATAPI controller 102 may be replaced by other controllers, buffers, network interfaces, or input/output interfaces. The ATA bus 108 may be replaced by other buses, preferably a bus with an address to which a device does not respond. The ATA device 104 may be replaced by other input/output devices such as a display, keyboard, mouse, speakers, magnetic or paper tape readers, or biometrics readers. The program memory 114 provides a computer-readable media with computer-readable code that may be executed by the CPU 100. The program memory 114 may be replaced by other computer-readable media or other computer-readable media may be used to transfer computer-readable code to the program memory 114 or other such computer-readable media. Such computer-readable media may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer-readable media may also be computer code transmitted by a computer data signal embodied in a carrier wave and representing a sequence of instructions that are executable by a processor. Such computer-readable media as a carrier wave or a CD-ROM may be used to transfer computer code to the program memory 114.

While this invention has been described in terms of several preferred embodiments, there are alterations, permutations, and substitute equivalents which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true scope of the present invention.

What is claimed is:

1. A method of exchanging data between a device and a bridge comprising a processor, a controller controllably connected to the processor, a buffer memory controller connected to the processor and the controller, and a bus connected between the controller and the device, wherein the bus has a first address which is the address of the device and a second address where no device is available and wherein the controller is able to automatically process commands in a first format and the device is able to process commands in a second format different than the first format, the method comprising:

sending a manual command in the second format from the controller over the bus to the first address wherein the controller ignores the manual command and the device receives the command;

converting the command into a converted command in the first format; and automatically sending the converted command from the controller over the bus to the second address wherein the controller uses the automatically sent converted command to prepare for an automatic data transfer and wherein the device ignores the converted command sent to the second address.

2. The method, as recited in claim 1, further comprising automatically transferring data through the controller between the buffer memory controller and the device, wherein the controller automatically transfers data as a result of the automatically sent converted command to the second address and the device transfers data as a result of the manual command.

3. The method, as recited in claim 2, wherein the bus is an ATA bus.

4. The method, as recited in claim 3, wherein the second format is an ATA specification and the first format is an ATA specification that is a subsequent version of the second format.

5. The method, as recited in claim 4, further comprising:

sending an automatic command from the controller to the first address designating a transfer mode;

receiving at the controller a status message from the device;

sending a manual command from the controller to the first address designating the transfer mode;

sending an automatic command from the controller to the second address designating the transfer mode; and receiving at the controller a status message from the device, wherein the controller interprets the status message as being from the second address.

6. The method, as recited in claim 5, further comprising:

receiving requests from a 1394 PHY to the processor; and converting the requests to commands.

7. Computer-readable media for exchanging data between a device and a bridge comprising a processor, a controller controllably connected to the processor, a buffer memory controller connected to the processor and the controller, and a bus connected between the controller and the device, wherein the bus has a first address which is the address of the device and a second address where no device is available and wherein the controller is able to automatically process commands in a first format and the device is able to process commands in a second format different than the first format, comprising:

computer-readable code for sending a manual command in the second format from the controller over the bus to the first address wherein the controller ignores the manual command and the device receives the command;

computer-readable code for converting the command into a converted command in the first format; and computer-readable code for automatically sending the converted command from the controller over the bus to the second address wherein the controller uses the automatically sent converted command to prepare for an automatic data transfer and wherein the device ignores the converted command sent to the second address.

8. The computer readable media, as recited in claim 7, further comprising computer-readable code for automatically transferring data through the controller between the buffer memory controller and the device, wherein the controller automatically transfers data as a result of the automatically sent converted command to the second address and the device transfers data as a result of the manual command.

9. The computer-readable media, as recited in claim 8, further comprising:
computer-readable code for sending an automatic command from the controller to the first address designating a transfer mode;
computer-readable code for receiving at the controller a status message from the device;
computer-readable code for sending a manual command from the controller to the first address designating the transfer mode;
computer-readable code for sending an automatic command from the controller to the second address designating the transfer mode; and
computer-readable code for receiving at the controller a status message from the device, wherein the controller interprets the status message as being from the second address.

10. The computer-readable media, as recited in claim 9, further comprising:
computer-readable code for receiving requests from a 1394 PHY to the processor; and
computer-readable code for converting the requests to commands.

11. A computer-readable media for transmitting data from a computer system comprising a processor, a bus with at least a first address for which no device is available and an element connected between the processor and the bus, comprising computer-readable code for sending a message from the element to the first address where no device is available, wherein the sending of the message prepares the element connected between the processor and the bus, wherein a device is connected to the bus wherein the device is at a second address different from the first address, and wherein the element is a controller that is able to automatically process messages in a first format and the device is able to process messages in a second format different than the first format, further comprising:
computer-readable code for sending a manual command in the second format from the controller to the second address;
computer-readable code for converting the command to a converted command in the first format, wherein the message sent from the controller to the first address is a converted command; and
computer-readable code for receiving a reply from the second address.

12. The computer-readable media, as recited in claim 11, wherein the controller interprets the receiving the reply from the second address as a reply from the first address.

13. The computer-readable media, as recited in claim 11, wherein the controller automatically sends the converted message command after the sending the manual message command but before receiving the reply from the second address.

14. The computer-readable media, as recited in claim 11, wherein the first format is an earlier version of a protocol specification than the second format.

15. The computer-readable media, as recited in claim 11, further comprising:
computer-readable code for sending an automatic command from the controller to the second address designating a transfer mode;
computer-readable code for receiving at the controller a status message from the device;
computer-readable code for sending a manual command from the controller to the second address designating the transfer mode;
computer-readable code for sending an automatic command from the controller to the first address designating the transfer mode; and
computer-readable code for receiving at the controller a status message from the device, wherein the controller interprets the status message as being from the first address.

16. The computer-readable media, as recited in claim 11, wherein the device at the second address ignores messages sent to the first address.

17. A computer-readable media for transmitting data from a computer system comprising a processor, a bus with at least a first address for which no device is available and an element connected between the processor and the bus, comprising computer-readable code for sending a message from the element to the first address where no device is available, wherein the sending of the message prepares the element connected between the processor and the bus, wherein a device is connected to the bus wherein the device is at a second address different from the first address, and wherein the element is a controller that is able to automatically process messages in a first format and is connected to a buffer memory controller and the device is able to process messages in a second format different than the first format, further comprising:
computer-readable code for sending a manual command in the second format from the controller to the second address, wherein the controller ignores the manual command and the device receives the command;
computer-readable code for converting the command to a converted command in the first format, wherein the message sent from the controller to the first address is a converted command and is automatically sent by the controller so that the converted command prepares the controller for an automated data transfer and wherein the device ignores the converted command; and
computer-readable code for automatically transferring data through the controller between the buffer memory controller and the device.

* * * * *